United States Patent [19]

Herman et al.

[11] 3,860,545

[45] Jan. 14, 1975

[54] THERMOPLASTIC FILM FORMING COMPOSITION CONTAINING TITANIUM DIOXIDE MICROVOIDS

[76] Inventors: Daniel F. Herman, 39 Hemlock Cir., Princeton, N.J. 08540; Dominic Simone, 22 Greentree Ter., Lincroft, N.J. 07738

[22] Filed: Nov. 5, 1973

[21] Appl. No.: 412,556

Related U.S. Application Data

[62] Division of Ser. No. 212,657, Dec. 27, 1971.

[52] U.S. Cl. .................. 260/29.6 RB, 260/29.6 RW
[51] Int. Cl. ....... C09d 3/84, C08f 19/10, C08f 7/04, C08f 3/68
[58] Field of Search .... 260/29.6 RB, 29.6 RN, 17 R

[56] References Cited
UNITED STATES PATENTS
3,669,728   6/1972   Seiner ............................... 260/29.6
3,817,880   6/1974   Kreider ....................... 260/29.6 RB
3,819,542   6/1974   Kreider ....................... 260/29.6 RB FOREIGN PATENTS OR APPLICATIONS
1,111,394   2/1962   Germany

*Primary Examiner*—Howard E. Schain
*Assistant Examiner*—Peter F. Kulkosky

[57] ABSTRACT

A new film forming and drying composition of matter has been prepared comprising an emulsion containing thermoplastic polymeric resin, a solvent for said resin, an emulsifying agent and microdroplets of water containing $TiO_2$ pigment particles, said composition capable of forming microvoids of air upon drying. In the dried film the $TiO_2$ pigment particles are present in the microvoids in an amount of from 0.4% to 15% by volume of the total volume of the microvoids. The microvoids have a diameter of from $01.\mu$ to $1.0\mu$ and a total microvoid volume of from 55% to 75% of the total volume of the dried film.

6 Claims, No Drawings

THERMOPLASTIC FILM FORMING COMPOSITION CONTAINING TITANIUM DIOXIDE MICROVOIDS

This application is a division of application Ser. No. 212,657 filed Dec. 27, 1971.

BACKGROUND OF THE INVENTION

Various methods have been described in the prior art for producing coating compositions which contain air microvoids in the dried film. These dried films are opaque due to the light scattering properties of the air microvoids present in the film.

It has been discovered that the opacity of these films may be greatly increased when titanium dioxide pigment particles are present in the microvoids.

SUMMARY OF THE INVENTION

A new film forming and drying composition of matter has been prepared comprising an emulsion containing a thermoplastic polymeric resin, a solvent for said resin, microdroplets of water suspended in said emulsion, an emulsifying agent, and $TiO_2$ pigment particles, said composition containing from 5% to 15% polymeric resin, and for each part of resin there are from 2 to 20 parts of solvent, from 1 to 6 parts of watr, from 0.1 to 0.2 part emulsifier and from 0.1 to 1.5 parts $TiO_2$. All of the parts are expressed by weight. The microdroplets of water suspended in the emulsion are of size from $0.1\mu$ to $1.0\mu$. This film forming and drying cmposition when spread onto a surface and dried is capable of forming microvoids of air in the film which have a size from $0.1\mu$ to $1.0\mu$ in diameter. The $TiO_2$ pigment particles are present in the microvoids in amount of from 0.4% to 15% by volume of the total volume of the microvoids and the amount of microvoids present in said film being from 55% to 75% by volume of the total volume of said dried film.

DESCRIPTION OF THE PREFERRED EMBODIMENTS

The thermoplastic polymeric resins employed in the instant invention include cellulose acetate butyrate, polymethyl methacrylate, polystyrene, and mixtures and copolymers thereof.

The solvent for the polymer must have a boiling point lower than the boiling point of water and it must be insoluble in water at least to the extent of being able to form a separate phase in the water. Satisfactory solvents include ethyl acetate, methyl ethyl ketone, benzene and the like.

The emulsifying agent employed in the instant invention is a polymer of ethyl acrylate grafted onto polyethylene oxide. This particular type of emulsifying agent may be prepared according to the procedure described in Deutsche Auslegeschrift No. 1,111,394.

The film forming and drying composition of the instant invention was prepared by the following steps:
1. a thermoplastic polymeric resin was dissolved in a solvent to form a solution;
2. an emulsifying agent was added to the solution;
3. $TiO_2$ pigment was dispersed in water to form an aqueous slurry;
4. The polymer-solvent solution containing the emulsifying agent was admixed with high shear with the $TiO_2$ pigment aqueous slurry to form an emulsion containing water droplets of size from $0.1\mu$ to $1.0\mu$. The $TiO_2$ pigment particles remained in the water droplets.

In carrying out the process of the instant invention, the amount of polymeric resin used was sufficient to produce from 5% to 15% of the film forming and drying composition.

The amount of solvent used was from 2 to 20 parts for each part of polymeric resin. The amount of emulsifying agent used was from 0.1 to 0.2 part for each part of resin. The amount of $TiO_2$ used was 0.1 to 1.5 parts for each part of resin. All of the parts are expressed by weight. The amount of water used was from 1.2 to 6 volumes for each volume of resin.

When this emulsion was used to form a protective coating or film, the emulsion was spread onto a surface and allowed to dry. As the emulsion started to dry, the solvent for the resin began to evaporate and when a major portion of the solvent was evaporated, the resin precipitated from solution and formed the matrix for the dried film. Upon further drying, the residual solvent and the water were evaporated leaving air microvoids in the polymer matrix. The $TiO_2$ pigment particles remained in the microvoids as the water was evaporated.

It is necessary to have the $TiO_2$ pigment particles associated with the water droplets in the emulsion in order to have the $TiO_2$ particles present in the air microvoids in the dried film.

If the $TiO_2$ particles are added to the organic solution of the polymer instead of being added to water, the $TiO_2$ particles will remain in the resin matrix not in the microvoids.

High opacity of the dried film is obtained only when the $TiO_2$ particles are present in the microvoids.

The amount of air voids in the final dried film occupied from 55% to 75% of the total volume of the dried film. The microvoids themselves had a diameter of from $0.1\mu$ to $1.0\mu$ and $TiO_2$ pigment particles occupies from 0.4% to 15% of the total volume of the microvoids.

In order to describe more fully the instant invention, the following examples are presented:

EXAMPLE 1

In this example an emulsion was produced which upon forming a dried film produced an opaque white film having high hiding power. This emulsion was produced as follows:

10 grams of cellulose acetate butyrate were dissolved in 90 grams of ethyl acetate. Into this solution were dissolved 1.93 grams of an emulsifier (ethylacrylate garfted onto polyethylene oxide).

1.91 grams of $TiO_2$ pigment were dispersed n 27.15 grams of water. 2.97 grams of the water added were employed to saturate the ethyl acetate while 24.18 grams of the water added were employed to provide 60% voids in the emulsion formed.

The solution containing the polymeric resin, the solvent and the emulsifier were mixed with the water containing the dispersed $TiO_2$ pigment particles in a Waring Blender at high speed until droplets of size less than 1.0 micron were formed in the emulsion.

The emulsion obtained contained water droplets of size from $0.1\mu$ to $1.0\mu$ dispersed in the organic solution. It had also been found that the $TiO_2$ particles were present in the water droplets. The emulsion contained 1.45% $TiO_2$.

When this emulsion was spread onto a surface and allowed to dry, the dried film had the following properties:

| | |
|---|---|
| Void Volume | 64.7% |
| $TiO_2$ | 13.8% |
| Hiding Power | 125 sq. ft./gal. at contrast ratio of .98 |

EXAMPLE 2

In this example, the procedure of Example 1 was employed except that no $TiO_2$ pigment was used. The emulsion was formed as above and when used to form a film by spreading onto a surface and allowed to dry, the dried film had the following properties:

| | |
|---|---|
| Void Volume | 65% |
| Hiding Power | 85 sq. ft./gal. at contrast ratio of .98 |

EXAMPLE 3

In this example, the procedure of Example 1 was repeated except that twice the amount of $TiO_2$ was employed. In this case the final emulsion contained 2.87% $TiO_2$. When this emulsion was spread onto a surface and allowed to dry, thd dried film had the following properties:

| | |
|---|---|
| Void Volume | 64.3% |
| $TiO_2$ | 24.3% |
| Hiding Power | 144 sq. ft./gal. at contrast ratio of .98 |

EXAMPLE 4

In this example, the procedure of Example 1 was repeated except that 4 times the amount of $TiO_2$ was employed. The final emulsion contained 5.58% of $TiO_2$. When this emulsion was spread onto a surface and allowed to dry, the dried film had the following properties:

| | |
|---|---|
| Void Volume | 61.5% |
| $TiO_2$ | 39.1% |
| Hiding Power | 175 sq. ft./gal. at contrast ratio of .98 |

EXAMPLE 5

In order to show the differences which exist when the $TiO_2$ pigment particles are placed in the film matrix instead of being placed in the microvoids, 3.82 grams of $TiO_2$ were dispersed in the cellulose acetate butyrate solution and the emulsion was formed in the same manner as that described in the previous examples.

In this example, the $TiO_2$ was found in the polymer material not in the air bubbles.

The emulsion contained 2.87% $TiO_2$. The hiding power was only 86 square feet per gallon at contrast ratio of 0.98 as compared to 144 square feet per gallon shown in Example 3.

EXAMPLE 6

In this example the $TiO_2$ particles were added to the organic constituents but no water was added to form water droplets in the emulsion.

In order to show the difference which exists when the $TiO_2$ is used alone without any water being used to form microvoids of air in the film, 3.82 grams of $TiO_2$ were employed which produced 3.6% $TiO_2$ in the final mixture and 24.3% $TiO_2$ in the final film. The dried film contained no voids. The hiding power was only 26 square feet per gallon at a contrast ratio of 0.98 which is far below the 85 square feet per gallon obtained when the film contained air droplets alone without the presence of $TiO_2$ pigment particles.

EXAMPLE 7

20 grams of polystyrene were dissolved in 80 grams of ethyl acetate. Into this solution were dispersed 3.2 grams of an emulsifier comprising ethyl acrylate grafted onto polyethylene oxide.

3.48 grams of $TiO_2$ pigment were dispersed in 60 grams of water. 3.84 grams of the water were added to saturate the ethyl acetate while 56.18 grams of the water were added to provide 60% voids in the emulsion formed. The solution containing the polymeric resin, the solvent and the emulsifying agent were mixed with the water containing the dispersed $TiO_2$ pigment particles in a Waring Blender at high speed until microdroplets of size less than $1\mu$ were formed in the emulsion. The emulsion contained microdroplets of water of size from $0.1\mu$ to $1.0\mu$. It was also observed that the $TiO_2$ pigment particles were present in the water microdroplets. The $TiO_2$ in this emulsion was 2.29%.

When the emulsion was spread onto a surface and allowed to dry, the dried film contained 14.14% $TiO_2$ and produced a white opaque film.

EXAMPLE 8

In this example, the procedure of Example 7 was repeated except that the polymeric resin was polymethyl methacrylate and the solvent was benzene. Again the emulsion contained 2.29% $TiO_2$ and had a void volume of 60%.

When the emulsion was used to form a film, a dry opaque film was produced. The dried film contained 14.14% $TiO_2$.

EXAMPLE 9

In this example the procedure of Example 8 was repeated except that methyl ethyl ketone was used as the solvent in place of benzene.

The emulsion contained the same amount of $TiO_2$ and had the same void volume as Example 8. When the emulsion was used to form a film, the dried film produced was white and opaque.

While this invention has been described and illustrated by the examples shown, it is not intended to be strictly limited thereto, and other variations and modifications may be employed within the scope of the following claims.

We claim:

1. A film forming and drying composition of matter consisting essentially of an emulsion of a thermoplastic polymeric resin, a solvent for said resin, said resin disolved in said solvent, an emulsifying agent and microdroplets of water suspended in said emulsion and $TiO_2$ pigment particles, said microdroplets of water containing said $TiO_2$ particles, said resin selected from the group consisting of polymethyl methacrylate, polystyrene and copolymers thereof, said solvent having a boiling point lower than the boiling point of water and said solvent being inert and insoluble in water to the extent of forming a separate phase in the water, said emulsifying agent being a solid graft polymer of ethyl acrylate on polyethylene oxide, said composition containing from 5% to 15% polymeric resin, and for each part of polymeric resin there are from 2 to 20 parts of solvent, from 1 to 6 parts of water, from 0.1 to 0.2 parts emulsifier and from 0.1 to 0.5 parts $TiO_2$, and said microdroplets of water being of of size from $0.1\mu$ to $1.0\mu$ in diameter; all said parts expressed by weight.

2. Composition according to claim 1 in which the thermoplastic polymeric resin employed is polymethyl methacrylate.

3. Composition according to claim 1 in which the thermoplastic polymeric resin employed is polystyrene.

4. A method for forming an emulsion useful as a film forming and drying composition which consists essentially of dissolving a thermoplastic polymeric resin in a solvent to form a solution, said resin selected from the group consisting of polymethyl methacrylate, polystyrene and copolymers thereof, the amount of said resin employed being sufficient to produce an emulsion having from 5% to 15% polymeric resin, the amount of solvent added being from 2 to 20 parts for each part of said polymeric resin, said solvent having a boiling point lower than the boiling point of water and said solvent being inert and insoluble in water to the extent of forming a separate phase in the water, adding an emulsifying agent, said emulsifying agent being a solid graft polymer of ethyl acrylate on polyethylene oxide, the amount of said emulsifying agent being from 0.1 to 0.2 part for each part of said polymeric resin, forming an aqueous dispersed slurry of $TiO_2$ pigment particles, the amount of $TiO_2$ employed being from 0.1 to 1.5 parts for each part of polymeric resin; all of said parts being from 1.2 to 6 volumes for each volume of resin, adding said water - $TiO_2$ slurry with high shear to said solution to form an emulsion of water microdroplets of size from $0.1\mu$ to $1.0\mu$; said microdroplets of water containing said $TiO_2$ particles.

5. Method according to claim 4 in which the thermoplastic polymeric resin employed is polymethyl methacrylate.

6. Method according to claim 4 in which the thermoplastic polymeric resin employed is polystyrene.

* * * * *